US 12,451,774 B2

United States Patent
Zhong et al.

(12) United States Patent
(10) Patent No.: US 12,451,774 B2
(45) Date of Patent: Oct. 21, 2025

(54) MOLDING PARAMETERS FOR INJECTION MOLDED ROTOR PRODUCTION

(71) Applicant: ABB Schweiz AG, Baden (CH)

(72) Inventors: Sheng Zhong, Hillsborough, NC (US); Darren D. Tremelling, Apex, NC (US); Elio Alberto Perigo, Wendell, NC (US)

(73) Assignee: ABB Schweiz AG, Baden (CH)

( * ) Notice: Subject to any disclaimer, the term of this patent is extended or adjusted under 35 U.S.C. 154(b) by 126 days.

(21) Appl. No.: 18/307,371

(22) Filed: Apr. 26, 2023

(65) Prior Publication Data

US 2024/0364190 A1 Oct. 31, 2024

(51) Int. Cl.
*H02K 15/02* (2025.01)

(52) U.S. Cl.
CPC .................................... *H02K 15/02* (2013.01)

(58) Field of Classification Search
CPC .............................. H02K 15/02; B29C 45/16
See application file for complete search history.

(56) References Cited

U.S. PATENT DOCUMENTS

| | | | |
|---|---|---|---|
| 6,684,483 B2 * | 2/2004 | Rahman | H02K 15/03 29/598 |
| 9,601,976 B2 | 3/2017 | Kaiser et al. | |
| 10,207,439 B2 | 2/2019 | Kaiser et al. | |
| 10,686,351 B2 * | 6/2020 | Okuyama | H02K 1/2766 |

FOREIGN PATENT DOCUMENTS

| | | | | |
|---|---|---|---|---|
| CN | 114598059 A | * | 6/2022 | ............ H02K 19/14 |
| EP | 4131747 A1 | | 2/2023 | |
| GB | 1584723 A | * | 2/1981 | .......... H02K 15/021 |
| JP | 2007-159245 A | | 6/2007 | |
| JP | 2016123143 A | * | 7/2016 | |
| JP | 2017103940 A | * | 6/2017 | |
| JP | 6575202 B2 | * | 9/2019 | |
| JP | 2021-087296 | | 6/2021 | |
| WO | WO-2011032201 A1 | * | 3/2011 | ............ H02K 15/02 |

OTHER PUBLICATIONS

Machine translation JP2016123143A (Year: 2016).*
Machine translation JP2021087296A (Year: 2021).*
Machine translation JP2017103940A (Year: 2017).*

(Continued)

*Primary Examiner* — Abbas Rashid
*Assistant Examiner* — Ayne K. Swier
(74) *Attorney, Agent, or Firm* — Leydig, Voit & Mayer, Ltd.

(57) ABSTRACT

A method for molding a magnetic material into a rotor stack, including providing a polymer melt including magnetic compound particles and a polymer binder, providing a rotor including a plurality of cavities, the rotor being arranged in a mold having a mold cavity surface, and providing a gap between the outer periphery of the rotor and the mold cavity surface. The method also includes filling a first volume of the polymer melt into the cavities of the rotor at a first pressure and filling a second volume of the polymer melt into the rotor at one or more second pressures, the one or more second pressures being less than the first pressure and above an ambient pressure.

18 Claims, 12 Drawing Sheets
(2 of 12 Drawing Sheet(s) Filed in Color)

(56) References Cited

OTHER PUBLICATIONS

Machine translation JP6575202B2 (Year: 2019).*
Machine translation CN114598059A (Year: 2022).*
Baruffi et al., "Micro-Injection Moulding In-Line Quality Assurance Based on Product and Process Fingerprints," *Micromachines*, 9(6): 23 pp. (Jun. 11, 2018).
European Patent Office, Extended European Search Report in European Patent Application No. 24172383.2, 12 pp. (Oct. 11, 2024).

* cited by examiner

-PRIOR ART-

MOLDING PARAMETERS FOR INJECTION MOLDED ROTOR PRODUCTION

FIELD

The present disclosure relates to methods producing injection molded rotors, methods for determining parameters for injection molding rotors, and parameters for injection molding rotors.

BACKGROUND OF THE INVENTION

Conventional reluctance motors include rotors with a soft magnetic material. The rotors include a plurality of laminations stacked together. Once stacked, cavities formed within the individual laminations and within the resultant rotor are filled manually with magnets, such as sintered magnets. Because the shape of the cavities in the rotor must be repeated with sufficiently controlled tolerances across a plurality of laminations and because of the complex shape of each lamination, synchronous reluctance rotors can be expensive to produce. These costs are further increased by the need to create complex magnet shapes, the need for the magnets to have tightly controlled tolerances that are compatible with the lamination tolerances, and the manual manufacturing complexities associated with aligning and inserting magnets during a manufacturing process. Accordingly, there is a need for reluctance rotor production methods that reduce manufacturing complexity and/or cost.

BRIEF SUMMARY OF THE INVENTION

A method for molding a magnetic material into a rotor stack, comprising providing a polymer melt including magnetic compound particles and a polymer binder, providing a rotor comprising a plurality of cavities, the rotor being arranged in a mold having a mold cavity surface, and providing a gap between the outer periphery of the rotor and the mold cavity surface. The method also comprises filling a first volume of the polymer melt into the cavities of the rotor at a first pressure and filling a second volume of the polymer melt into the rotor at one or more second pressures, the one or more second pressures being less than the first pressure and above an ambient pressure.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Subject matter of the present disclosure will be described in even greater detail below based on the exemplary figures. All features described and/or illustrated herein can be used alone or combined in different combinations. The features and advantages of various implementations will become apparent by reading the following detailed description with reference to the attached drawings, which illustrate the following.

DETAILED DESCRIPTION OF THE INVENTION

Aspects of the present disclosure include methods for determining parameters for rotor injection molding. Aspects of the present disclosure also include methods for producing reluctance motors and for injection molding reluctance rotor cavities. The disclosed methods avoid insertion of preformed magnets into rotor cavities, thereby reducing production complexity and also reducing the likelihood of damage to magnets and/or rotor laminations. The disclosed methods also ensure production of a rotor with adequate overall tolerances and prevention of lamination and rotor expansion that may otherwise occur without proper injection molding techniques. The disclosed methods also provide for an injection molding process that is optimized in terms of cycle time, injection and packing pressure, cavity filling percentage, and fill mass, thereby improving both the quality of injection molded reluctance rotors and the efficiency of the process by which they are produced.

Figure 1:
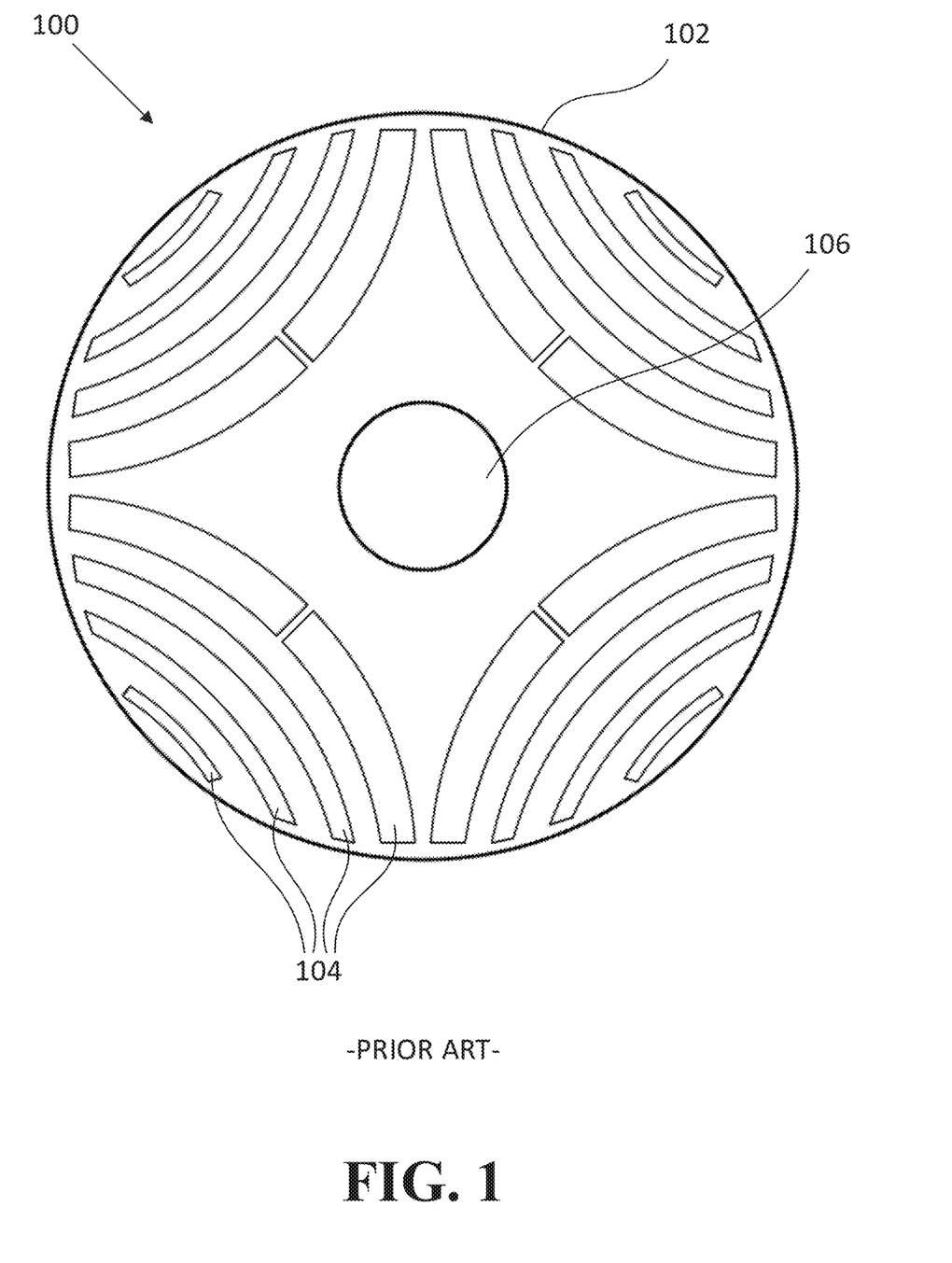
FIG. 1 illustrates a conventional reluctance rotor lamination with unfilled cavities.

FIG. 1 illustrates a reluctance rotor lamination 100 known in the prior art. The lamination 100 includes a lamination body 102 having a plurality of cavities 104 and a shaft opening 106. Reluctance rotors can be assembled by stacking a plurality of rotor laminations 100 of similar or identical shape on a shaft. A stacked collection of a plurality of rotor laminations 100 will thus form a rotor body having a cross-section similar to a rotor lamination 100 within the stack. The cavities 104 of the rotor laminations 100, when stacked, form cavities along the length of a rotor and are configured such that magnets may be arranged in the cavities.

In the specific embodiment illustrated in FIG. 1, the rotor lamination 100 has four poles, each pole being formed by cavities 104 which are concave in a radial direction away from the shaft opening 106. However, it will be readily understood that a variety of shapes, sizes, and configurations of the lamination 100 are possible depending on the specific use case of the reluctance motor in which the rotor lamination 100 is used. However, the difficulty and cost of manufacturing magnets that are to be inserted into cavities 104 increase as the shape complexity and the quantity of the cavities 104 increases. For example, manufacturing a magnet for insertion into a smooth and curved cavity (such as those illustrated in FIG. 1) may be particularly difficult or costly, more complex cavity shapes will require correspondingly complex magnet geometries configured to fit in the cavity. Regardless of the shape of the cavities 104, inserting magnets into cavities 104 formed by stacked rotor laminations 100 also requires careful control of the tolerances of both the magnets and the rotor laminations 100. Variations in the area of similar cavities 104 across a plurality of stacked rotor laminations, for example, will cause inconsistent cross-sectional area of cavities across the axial length of a rotor. Such variations may cause fitment issues when inserting pre-fabricated magnets. Furthermore, constraints in pre-fabrication of the magnets to be inserted in the cavities 104 may constrain the geometry of the cavities 104. Furthermore, the design of the rotor cavities will be constrained by the capabilities of magnet manufacturing. Alignment of magnets for proper insertion into the cavities 104 may also become complicated depending on the shape and quantity of cavities 104 that must be filled. Manual insertion or processing by robot is still cost prohibitive when the design complexity increases.

Embodiments of the present invention address the foregoing limitations of conventional rotor laminations and their production by enabling magnetic material to be molded directly into the cavities of a rotor that comprises a plurality of rotor laminations 100. Rather than pre-fabricating magnets, the magnetic material of the reluctance rotor can thus be formed after the rotor laminations 100 are stacked to form a rotor body. Furthermore, complex geometries that would otherwise cause difficulties when prefabricating magnets are more difficult to achieve, as the cavities of a rotor can be used as molds during the molding process.

Figure 2A:
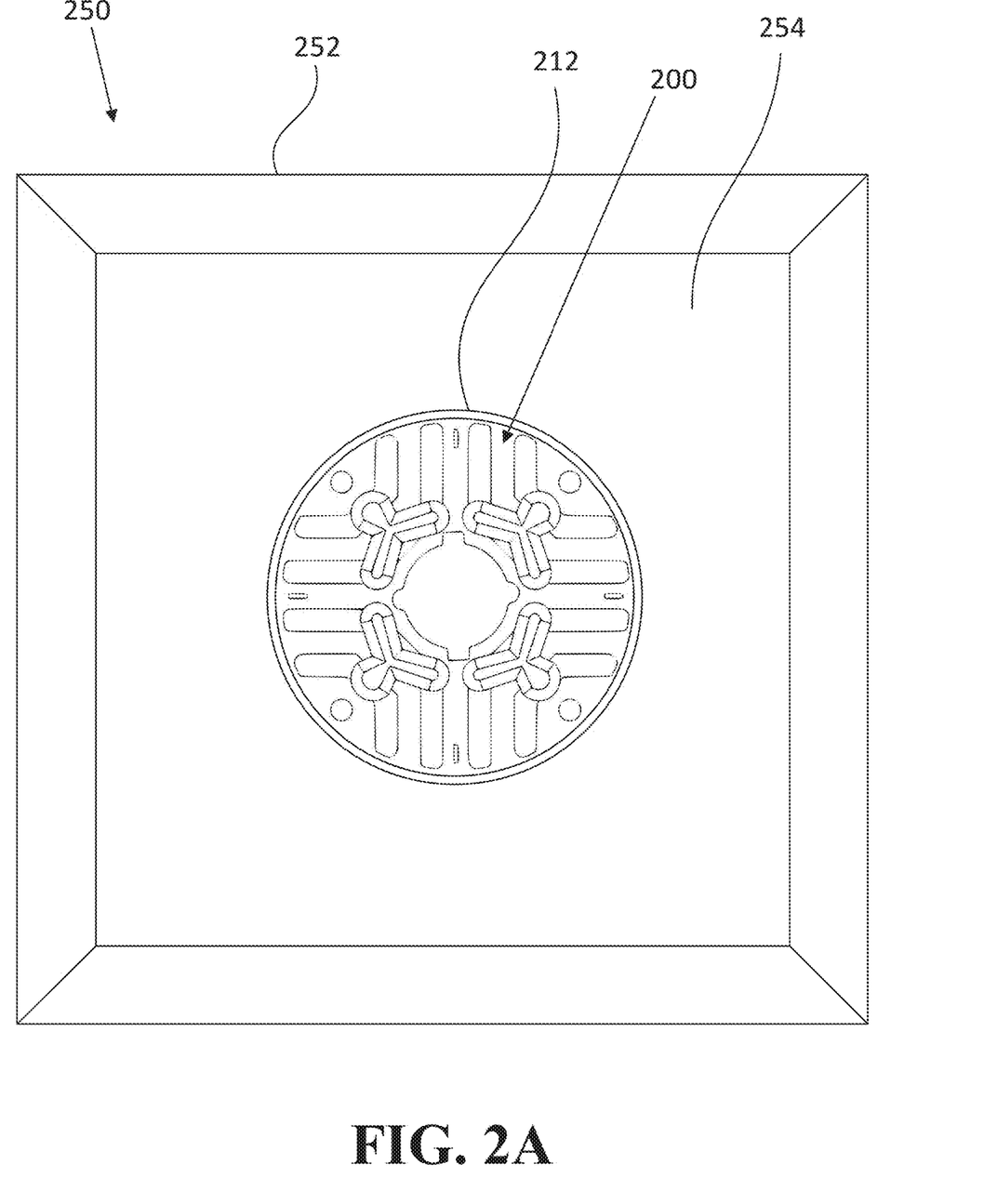
FIGS. 2A and 2B illustrate a lamination with gates and a mold for injection molding a reluctance motor with polymer bonded magnetic material.

FIG. 2A illustrates a stationary mold block 250 in which a rotor insert 200 may be inserted during an injection molding process. The mold block 250 includes an outer periphery 252 and an exterior surface 254. The mold cavity and its retaining wall 212 is included in the exterior surface and provides a space for the rotor insert 200 to be inserted into the mold block 250. It will be readily appreciated that the mold block 250 may have a variety of shapes and sizes other than the specific shape and size illustrated in FIG. 2B. The shape and size of the mold block is dependent upon a particular molding process, manufacturing facilities, and/or the shape and size of the rotor insert 200.

Figure 2B:
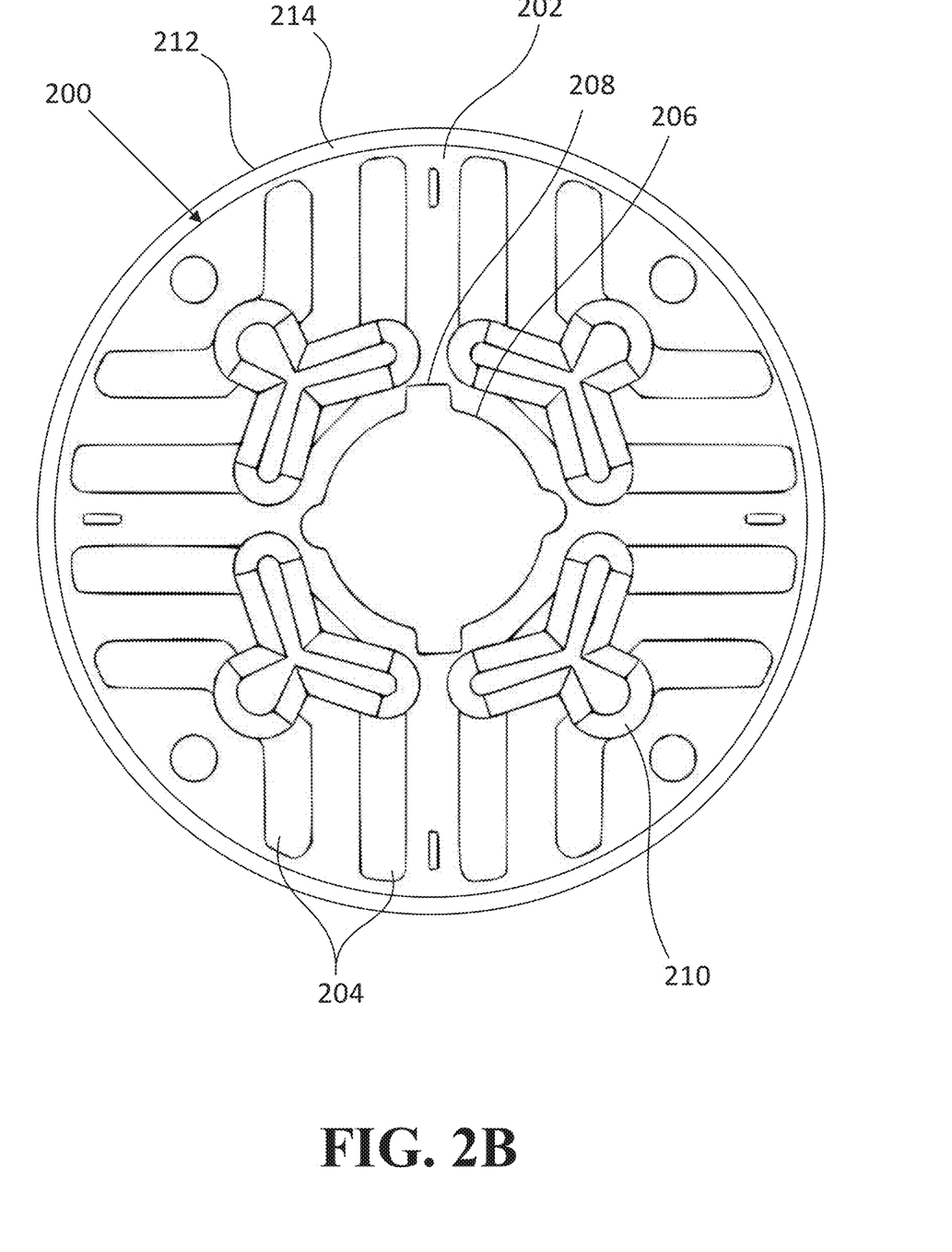

FIG. 2B illustrates a rotor insert 200 with gates 210 for injection molding a reluctance motor with polymer bonded magnetic material. The rotor insert 200 is made of a plurality of lamination bodies 202 stacked together with polymer-bonded magnet (PBM) filled in its cavities 204. The rotor insert 200 (and, accordingly, each of the lamination bodies 202 that make up the rotor insert 200) has a plurality of cavities 204 filled with plastics and a shaft opening 206. A plurality of gates 210 are arranged above the cavities 204, are part of the plastic fill, and reflect the manner in which a highly viscous plastic melt is directed into the cavities 204 under pressure. In the illustrated embodiment, the gates have a generally three-pronged shape, and each gate 210 is arranged at one of a plurality of poles of the rotor insert 200, although the particular shape, size and configuration of the gates can vary depending on cavity design. The illustrated three-pronged shape allows highly viscous plastic melt that is injected into the cavities 204 during injection molding to be distributed more evenly and for each cavity to be filled in the same period of time. It will be readily appreciated that other gate shapes and sizes may be realized without departing from the spirit of the present disclosure. For example, in an embodiment, each pole of the rotor insert 200 may include more than two cavities 204 that must be filled with a magnetic material. In such an embodiment, the gate may have to be larger to reach across a greater radial distance relative to the shaft opening 206 of the rotor insert 200. Furthermore, such an embodiment may require a gate shape with more prongs or a shape that does not include prongs, or the size of the prongs may change but accommodate extrusion of a plastic melt into all cavities 204 of a pole associated with the gate 210.

When rotor insert 200 is used together with a mold for injection molding magnetic materials into the cavities 204 of the rotor insert 200, the rotor insert 200 will expand, although the degree of expansion depends on the parameters of the injection molding process. For example, if an injection molding pressure is too high, the cavities 204 may expand to such a degree that the rotor insert 200 deforms and deviates significantly from its original outer perimeter, both in terms of diameter and shape. In such a case, the rotor insert 200 may deviate so far from its original outer circumferential shape and/or size that it becomes unsuitable for use in a reluctance motor. In a more detailed example, the high pressure imposed against the cavities 204 via injection molding may cause the rotor insert 200 to deform beyond acceptable tolerances. Such imperfections may affect performance of a reluctance motor that includes the rotor insert 200, or may prevent proper function of the reluctance motor entirely if the rotor insert 200 becomes too large in terms of its outer diameter to fit and rotate within a stator.

FIG. 2B illustrates a gap 214 between an outer periphery of the rotor insert 200 and retaining wall 212. The gap 214 ensures case of insertion and ejection of rotor insert 200. Without gap 214, the rotor insert 200 may expand to such a degree that rotor 200 cannot be removed from within retaining wall 212 without causing damage to the rotor 200 and/or retaining wall.

The plastic melt injected into the cavities 204 of the rotor insert 200 includes a magnetic compound and a polymer binder. The magnetic compound may be a ferrite or a hybrid magnetic compound including a plurality of materials with or without a ferrite.

FIGS. 3A to 3D illustrate injection molding parameter control schemes in graphical form where pressure is illustrated against time. Each of the graphs in FIGS. 3A to 3C include experimentally as well as theoretically obtained data points plotting pressure on the y-axis as a function of time, which is represented on the x-axis. The various graphs represent different control schemes, the comparative features, benefits, and drawbacks of which will be discussed hereafter. Each graph also illustrates parts of the plotted control scheme of a two-stage molding process that correlates to an injection process and which is followed by a packing process. During an injection molding process in which a polymer composite is used to fill rotor cavities, the injection process represents the first stage of the overall process in which high pressure is applied to push as much polymer composite into the rotor cavities as fast as possible, thereby filling the rotor cavities as full as possible in shortest time. The packing process represents a subsequent portion of the overall injection molding process in which pressure continues to be applied to the polymer melt to compensate for polymer shrinkage and remaining unfilled volume of the rotor cavities. Rotor deformation occurs during both the injection and packing process. To reduce deformation, lower pressures are preferred, but an optimal pressure must be determined to optimize cycle time while achieving sufficient performance and maintaining rotor deformation within acceptable limits. The parameters used to control the injection molding process include: (1) melt temperature and rotor insert temperature; (2) gate size; and (3) pressure. Higher melt and rotor insert temperatures lead to reduced polymer composite viscosity. Larger gate size may enable faster filling of rotor cavities by allowing a greater flow rate of polymer composite into the cavities. The molding process can be controlled more closely with lower pressure, but lower pressure also leads to longer processing/cycle times.

Figure 3A:
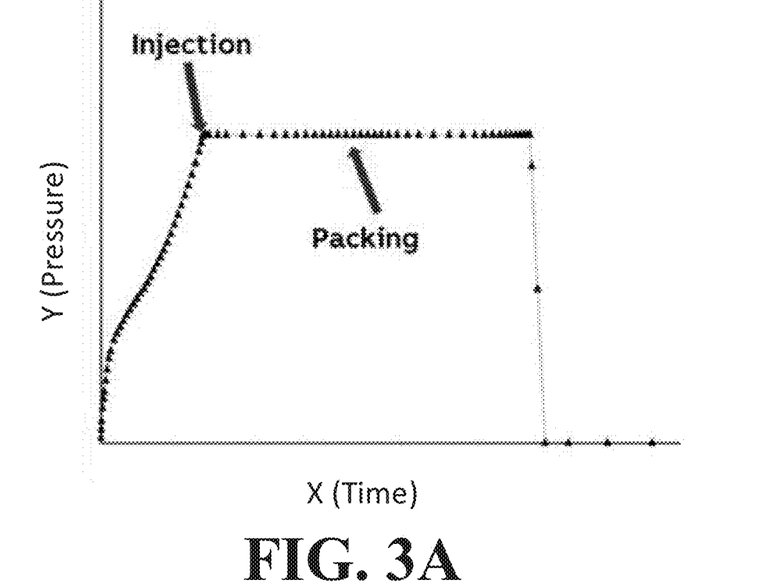
FIGS. 3A to 3D illustrate molding parameter control schemes.
Figure 3B:
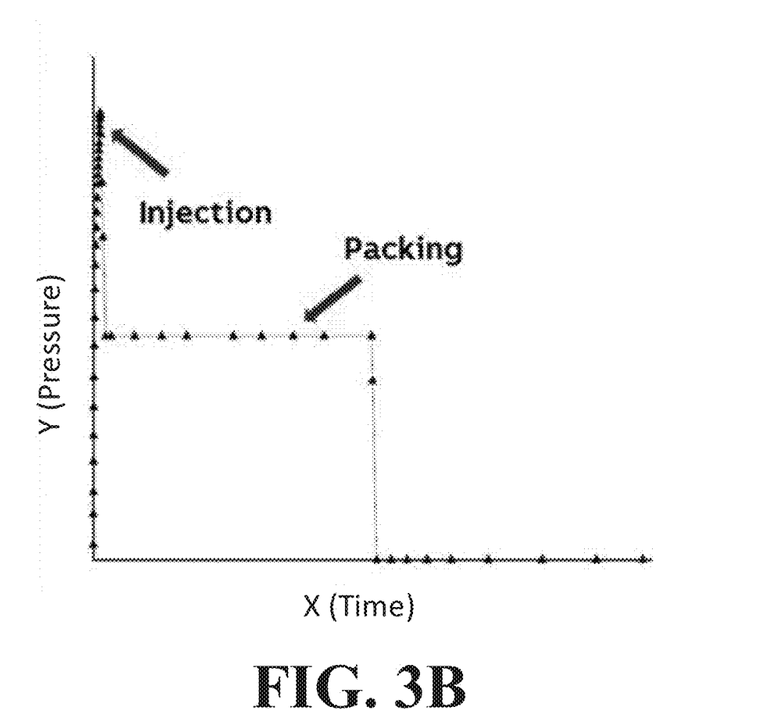
Figure 3C:
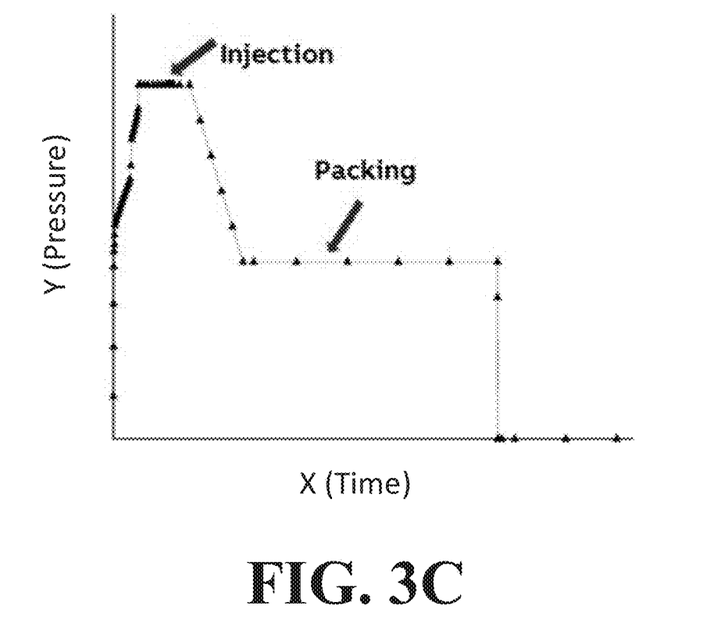

It will be readily understood that FIGS. 3A to 3C illustrate general pressure and time relationships, and thus do not include specific numerical values of pressure or time, as the generally illustrated relationships may be present across varying numerical values and/or ranges. It will also be readily understood that FIGS. 3A to 3C have been adjusted for individual scale, and thus do not correlate with one another in terms of scale. For example, the highest pressure illustrated in FIG. 3C should not be understood to correspond to or be limited to a higher or similar pressure relative to the highest illustrated pressure in FIG. 3A, as the scale of the y-axis in each graph is different. Instead, each of FIGS. 3A to 3C are understood to generally and separately illustrate features of individual control schemes. For a proper sense of relative scale between the control schemes illustrated in FIGS. 3A to 3C, reference may be made to FIG. 3D, which illustrates several control schemes on the same axes.

FIG. 3A illustrates a control scheme in which neither the injection process nor the packing process is restricted in order to optimize an injection molding process only for a fast cycle time. As shown in FIG. 3A, an unrestricted pressure may lead to an increase in pressure until a maximum pressure is reached. The maximum pressure is then held constant during the packing process. Upon completion of the packing process, the pressure is relieved and the injection molding process is complete. While the control scheme of FIG. 3A achieves the fastest cycle time of the control schemes illustrated in FIGS. 3A to 3C, it might generate the highest pressure in the rotor during molding and thus consequently causes the most severe deformation of a rotor due to employing injection and packing pressures.

FIG. 3B illustrates a control scheme in which packing pressure is deliberately reduced, thereby having the effect of reducing rotor deformation. Some deformation of the rotor is still caused by an injection pressure that is higher than the packing pressure. As shown in FIG. 3B, the injection pressure increases up to a maximum but is subsequently reduced until a relatively lower packing pressure is reached and maintained during the packing process. Upon completion of the packing process, the pressure is relieved and the injection molding process is complete. During the injection, this pressure is recorded at the injection point but does not reflect the real pressure in the cavity due to the pressure drop in the cavity. The control scheme of FIG. 3B increases cycle time but reduces the magnitude of rotor deformation caused by injection molding due to reduced packing pressure.

FIG. 3C illustrates a control scheme in which both injection and packing pressures are deliberately restricted. As shown in FIG. 3C, the injection pressure is increased until a pre-set maximum pressure is reached. The pressure is then maintained during the injection stage. After completion of injection, the pressure is decreased from the maximum injection pressure to a packing pressure, which is subsequently maintained during the packing process. Because a lower injection pressure is used in the control scheme of FIG. 3C relative to the control schemes of FIGS. 3A and 3B, the maximum pressure must be held for a longer period of time to complete the injection process. The control scheme of FIG. 3C results in a longer cycle time compared to that of FIGS. 3A and 3B, but also results in the least rotor deformation.

In view of the experimental results illustrated in FIGS. 3A to 3C, embodiments of the present disclosure provide optimized control schemes that balance the need to reduce cycle times with the need to limit rotor deformation caused by injection molding within acceptable limits.

Figure 3D:
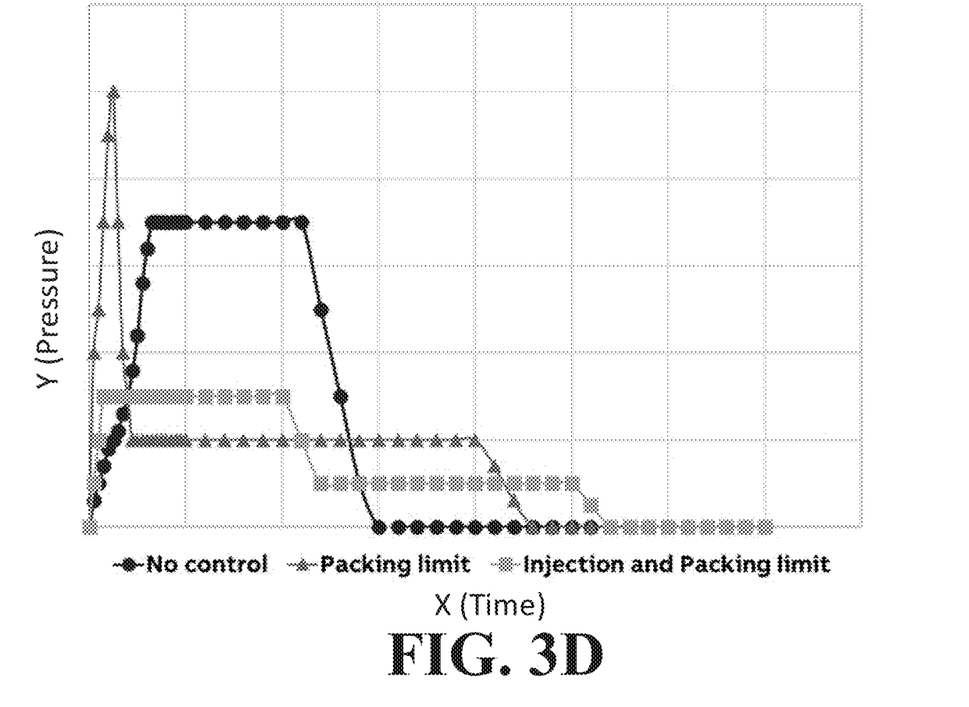

FIG. 3D illustrates control schemes comparable to those of each of FIGS. 3A to 3C on a single coordinate system to illustrate relative scale. As described in greater detail hereafter, the control scheme of FIG. 3B in which packing pressure is controlled results in a readily observable pressure spike early in a molding process, whereas other control schemes result in prolonged time periods during which peak pressure is maintained.

Figure 4:
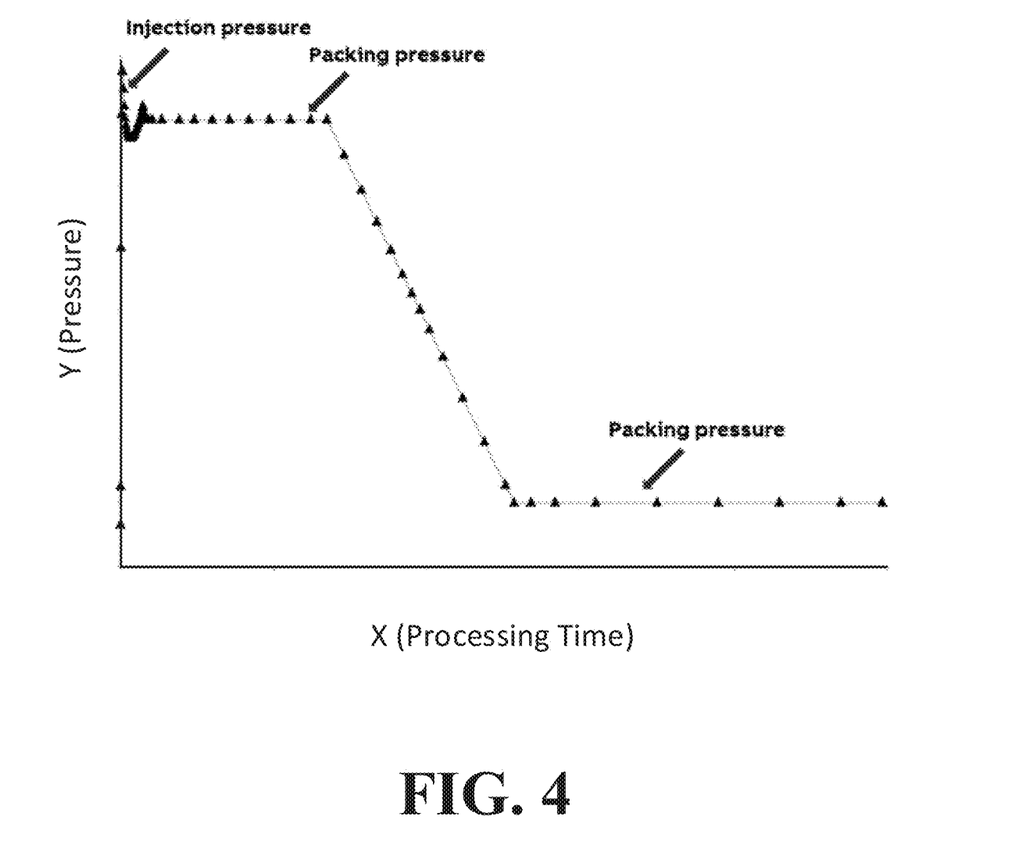
FIG. 4 illustrates a molding parameter control scheme.

FIG. 4 illustrates an injection molding control scheme according to an embodiment of the disclosure. In the control scheme illustrated in FIG. 4, high injection pressure is applied so that polymer melt can be injected into a cavity quickly. The high injection pressure is maintained and held until 50-99% of a rotor's filling volume is filled. In some embodiments, the high injection pressure is maintained and held until 80-99% of the rotor's filling volume is filled. A packing process then begins, which utilizes an initial packing pressure at or near the last injection pressure and a controlled decrease to a lower packing pressure. Although FIG. 4 illustrates a two-stage pressure packing process with a gradual linear descent from the first packing pressure to the second packing pressure, variations of packing pressure reduction may be employed within embodiments of the disclosure. For example, more than two packing pressures may be applied during the packing process and/or the decrease of packing pressure may be non-linear or stepwise. In an embodiment, a second packing pressure is one half to one twentieth of the first packing pressure in a multi-stage packing process. In an embodiment, the packing process includes only one packing pressure that is similar to or smaller than the injection pressure.

Figure 5:
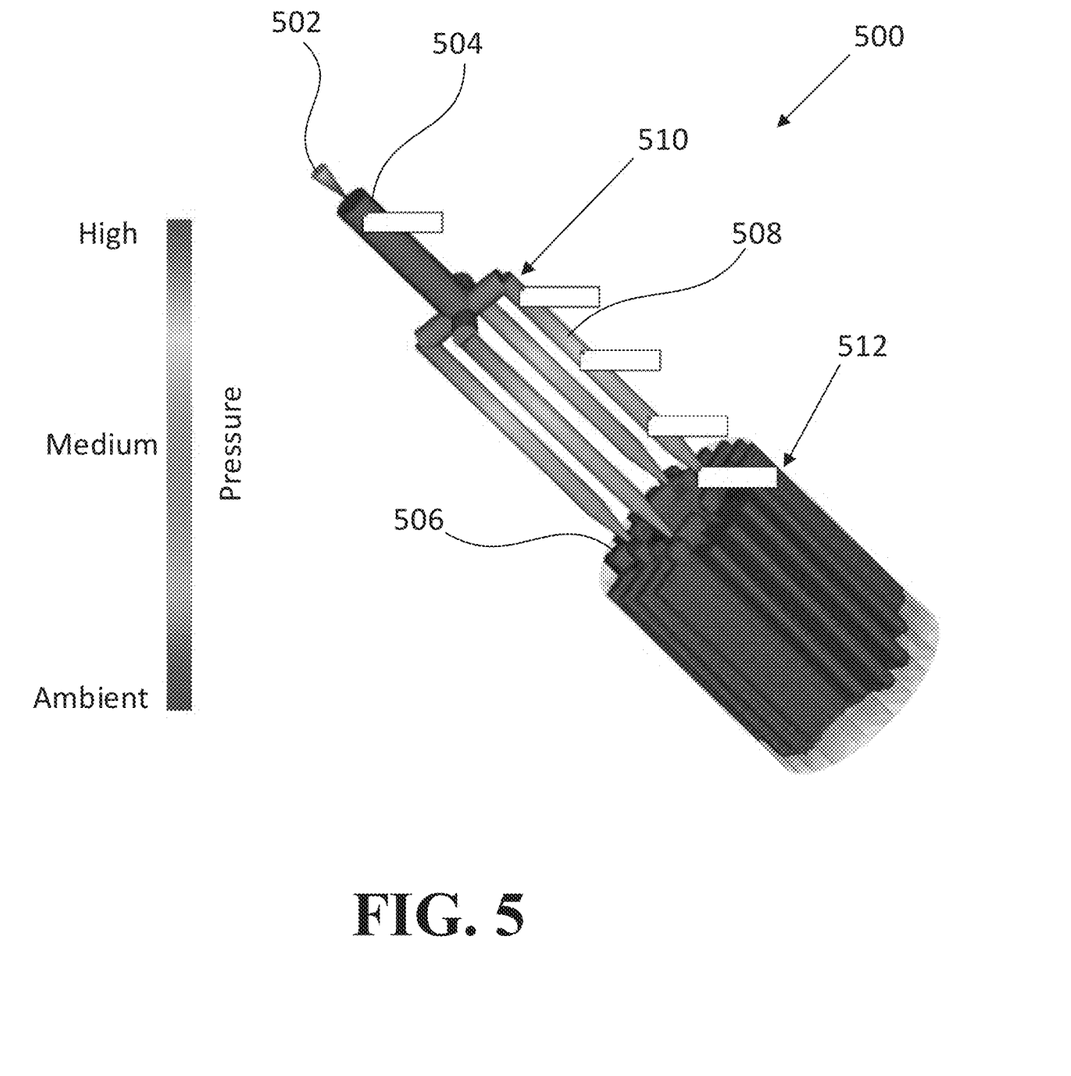
FIG. 5 illustrates an isometric view of an injection molding simulation model.

FIG. 5 illustrates an isometric view of an injection molding simulation model 500 at a time point of injection molding according to the present disclosure. The simulation model 500 includes a runner system 510 and a rotor insert and molding plastic 512. The runner system 510 includes an injection point 502 from which injection of polymer melt initially occurs, thereby injecting the polymer melt at pressure into the runner system 510. The runner system includes a sprue 504 acting as a conduit between the injection point 502 and gates 506. In the illustrated embodiment, the runner system 510 includes a sprue 504 that divides into four runners 508 evenly distributed spatially from one another, the four runners 508 having the same shape and volume. As a result, the runner system 510 evenly distributes polymer melt from the injection point 502 to each of the gates 506 to achieve even injection molding throughout the cavities of the rotor insert 512.

In some embodiments, the runner system 510 is a hot runner system in which all components of the runner system 510 are heated to decrease the viscosity of a polymer melt therein and avoid polymer frozen in the runner system. As a result of the polymer melt being heated and made less viscous, the pressures required to inject the polymer melt into the rotor insert 512 can be reduced. In some embodiments, the runner system 510 is heated to between 150 to 400 degrees Celsius depending on the plastic compounds. In some embodiments, the temperature of the runner system 510 is determined and controlled based on the particular composition of the polymer melt in the runner system 510.

FIG. 5 also illustrates a pressure variation of polymer melt within the runner system 510 during an injection process in which the rotor insert 512 has not yet been filled at or near capacity. In particular, FIG. 5 illustrates pressure drop during an injection stage. The highest pressure is exhibited at the portion of the sprue 504 nearest the injection point 502. The pressure observed at different portions of the runner system 510 decreases as distance from the injection point 502 increases. The pressure observed in the rotor insert 512 is at or near zero, as the filling volume of the rotor insert 512 is as yet to be completely filled. The pressure at the portions of the runner system 510 near the gates 506 is reduced in comparison to the pressure observed at or near the injection point 502.

Figure 6A:
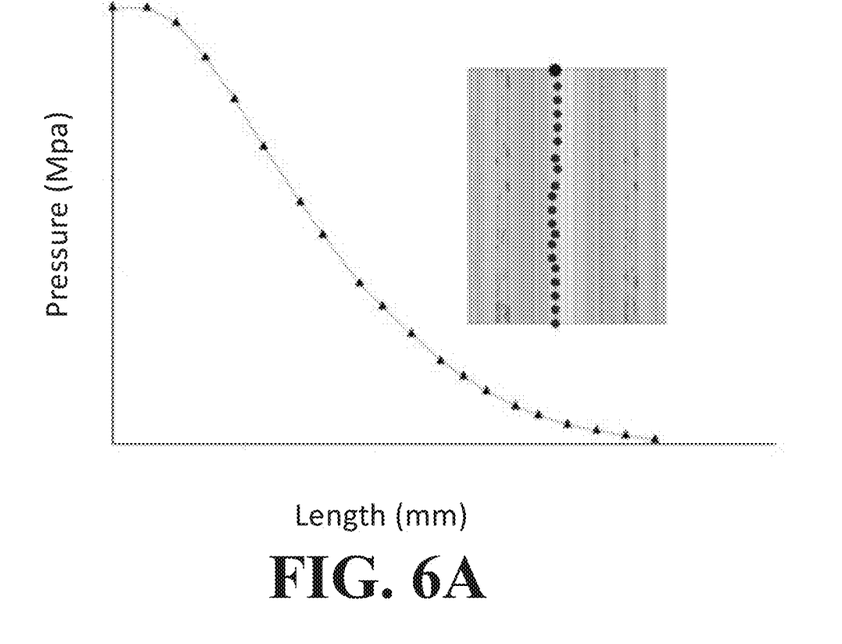
FIGS. 6A and 6B illustrate pressure drop simulations along a rotor cavity.
Figure 6B:
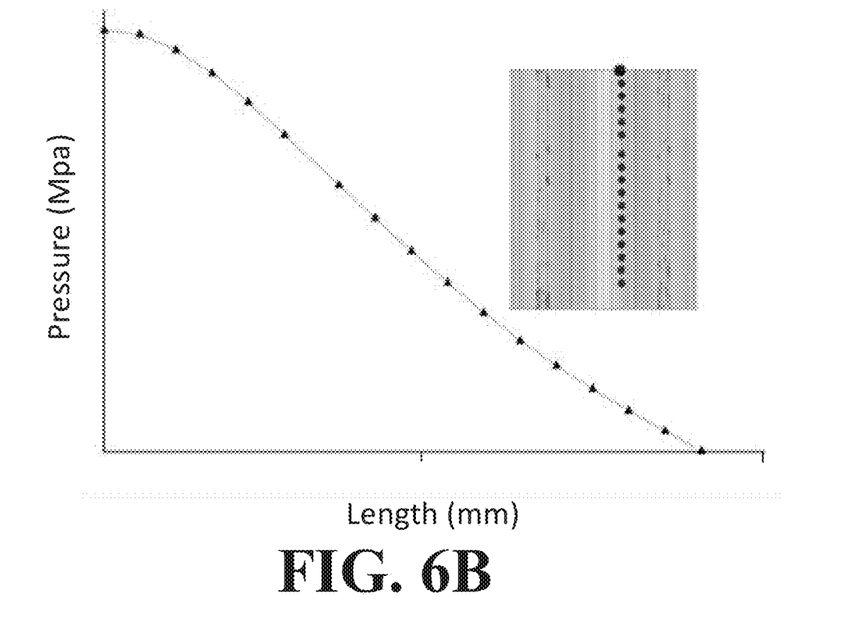
Figure 6C:
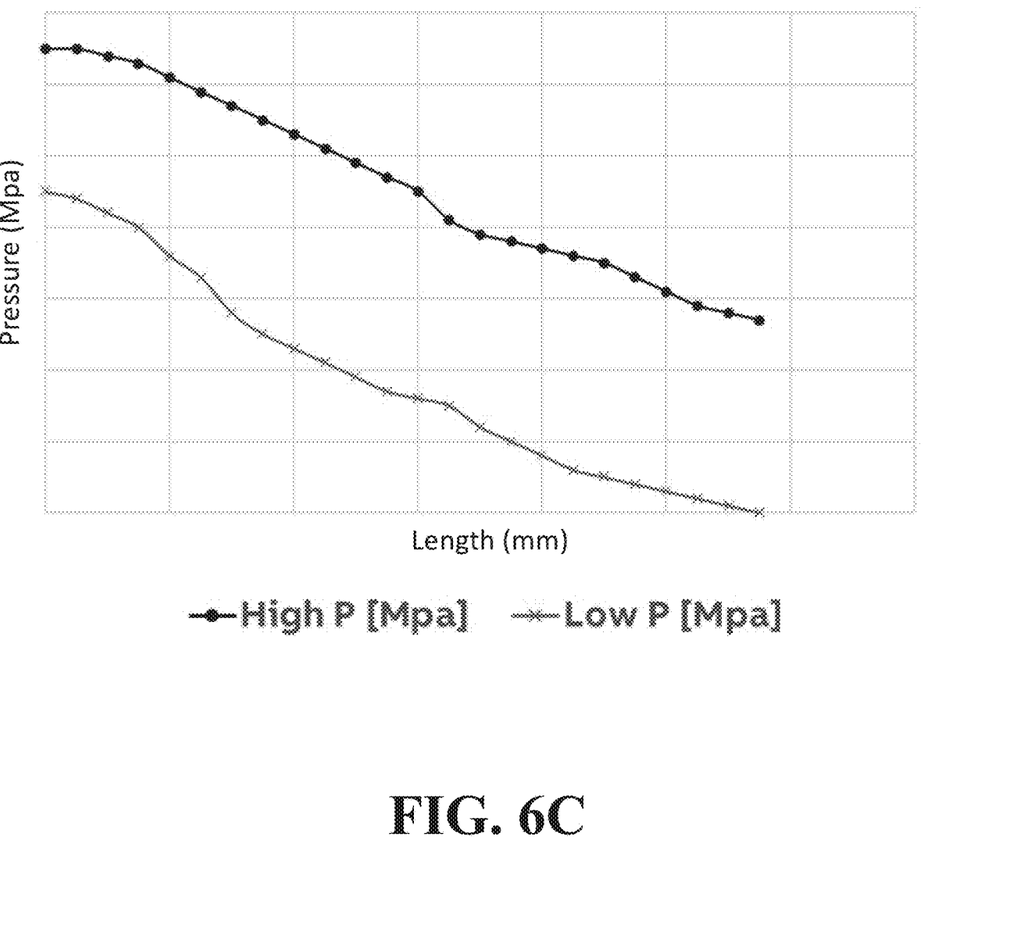
FIG. 6C illustrates pressure drop simulations along a rotor cavity at a high pressure and low pressure.

FIGS. 6A and 6B illustrate pressure drop simulations along a rotor cavity at varying packing pressures. In FIGS. 6A and 6B, the pressure illustrated is a pressure of a polymer in the rotor, and not a pressure observed by the rotor cavity itself or the rotor generally. Specifically, FIG. 6A illustrates the results of a pressure drop simulation along a rotor cavity. FIG. 6B illustrates the results of a pressure drop simulation along a rotor cavity when a packing pressure that is significantly reduced in comparison to the packing pressure of FIG. 6A is applied. In some embodiments, the packing pressure applied may be up to a tenth of the packing pressure applied in FIG. 6B. FIG. 6C illustrates similar pressure drop simulations to those of FIGS. 6A and 6B together on the same axes for comparative reference. Experimental results confirm that the magnitude of packing pressure applied during injection molding has a significant impact on the pressures observed within a rotor's cavities.

Figure 7A:
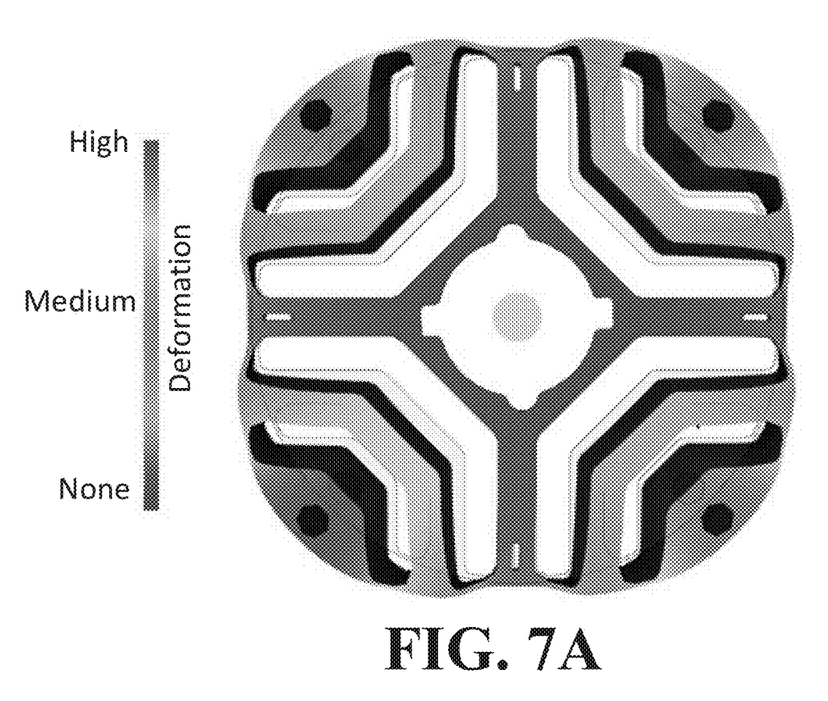
FIGS. 7A and 7B illustrate rotor deformation simulations.
Figure 7B:
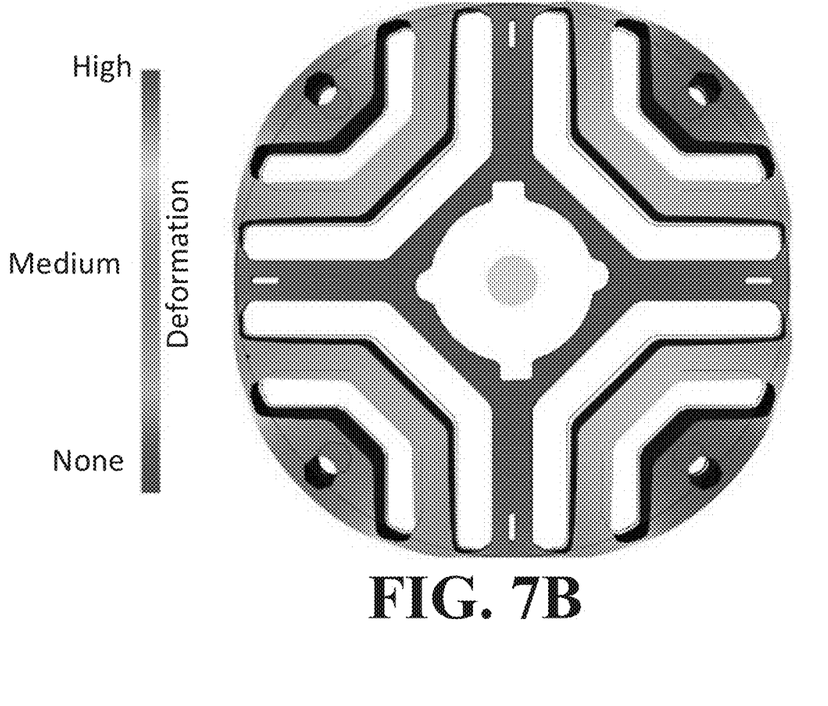

FIGS. 7A and 7B illustrate rotor deformation simulations with different packing pressure with FIG. 7A being of a higher packing pressure compared to the rotor illustrated in FIG. 7B. As a further experimental result based on the premise of FIGS. 6A and 6B to determine the effect of packing pressure, FIGS. 7A and 7B illustrate the differences in rotor deformation that may be observed based on packing pressure.

FIG. 7A illustrates simulated rotor deformation under a packing pressure of approximately 50~100 MPa. FIG. 7B illustrates simulated rotor deformation under a packing pressure of approximately 5~25 MPa. As readily observable based on the experimental simulations, the degree of rotor deformation observed under a packing pressure of approximately 50~100 MPa is significantly higher than the rotor deformation observed under a packing pressure of approximately 5~25 MPa. The internal pressure in the rotor cavity leads to the rotor deformation. Since the maximum internal pressure is always at or near the gate location and then is reduced axially along the rotor, the rotor deformation is thus the most prominent at the gate area. The maximum rotor deformation simulated in FIG. 7A is approximately 0.07 mm radially and the total diameter deformation is approximately 0.14 mm. This deformation is unacceptably large, causing a molded rotor to not fit properly in a stator. As the packing pressure is reduced to 5~25 MPa, as in FIG. 7B, the maximum deformation is reduced to approximately 0.015 mm radially and the total diameter increase is approximately 0.03 mm. The experimentally simulated deformation in FIG. 7B at 10 MPa is thus less than four times the deformation in FIG. 7A at 70 MPa. The pressure and deformation values of FIGS. 7A and 7B are selected for purposes of carrying out a simulation of molding parameters and resulting deformations, and are not to be construed as limiting all embodiments of the present disclosure.

Figure 8A:
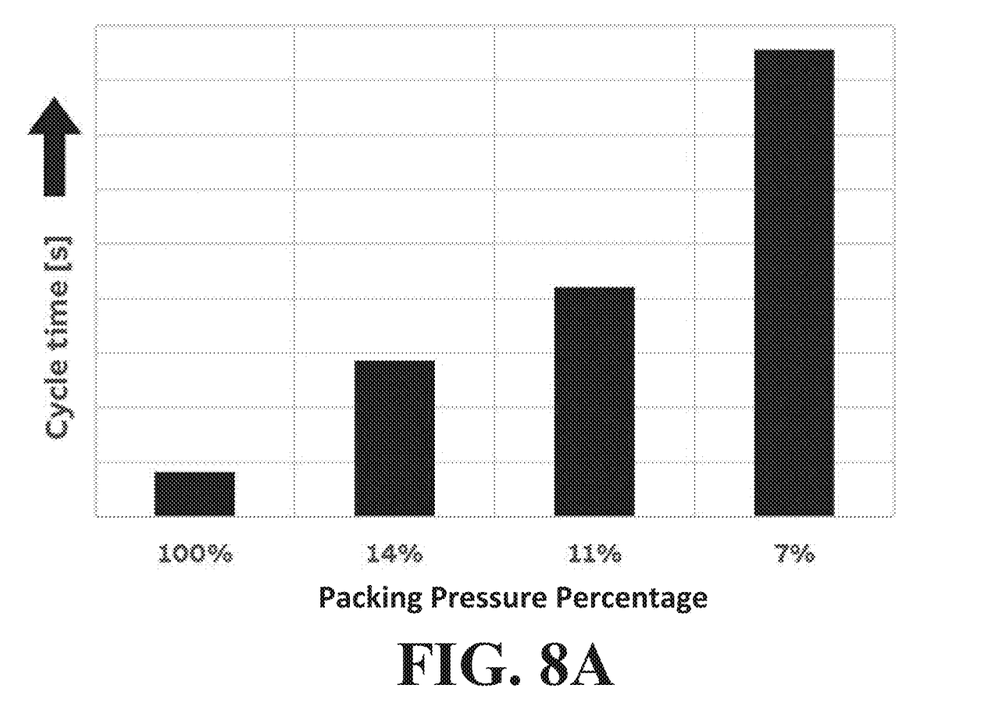
FIG. 8A illustrates cycle times based on various packing pressures.

FIG. 8A illustrates experimentally determined cycle times based on various packing pressure percentages employed during injection molding. The total cycle time is dramatically increased from approximately 3.5 and 10 times respectively with a packing pressure reduced approximately by 85% and 95%, respectively. Thus, polymer flow rate is also determined to be closely related to applied packing pressure. The lower the packing pressure, the lower the flow rate, and the longer the cycle time required to complete an injection molding process.

Figure 8B:
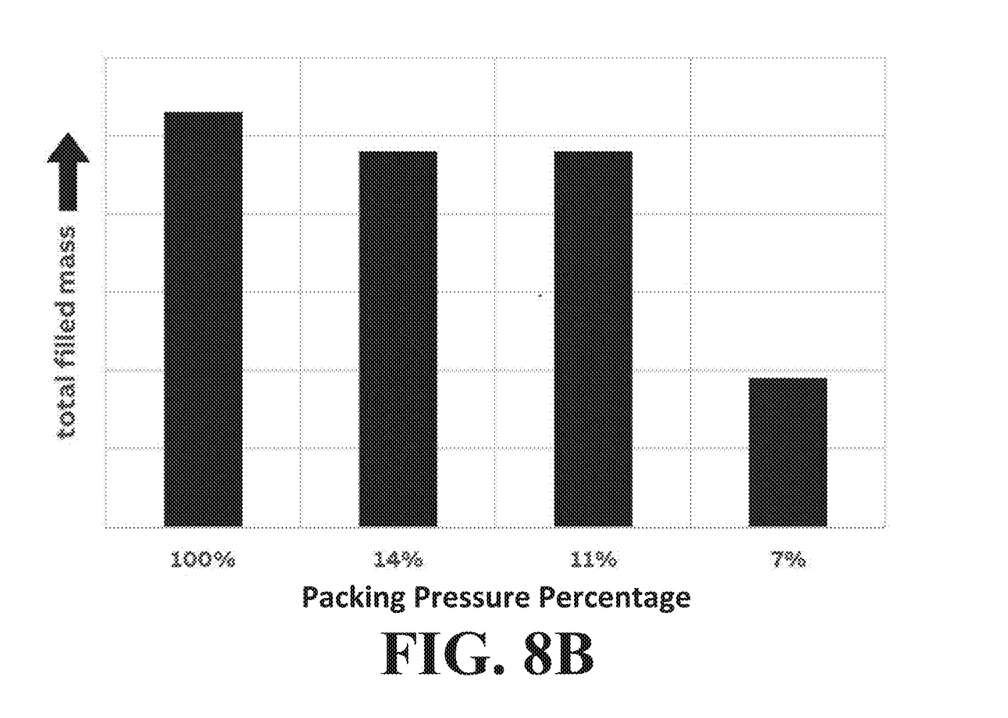
FIG. 8B illustrates total filled polymer mass based on various packing pressures.

FIG. 8B illustrates experimentally determined total filled polymer mass based on various packing pressure percentages employed during injection molding. The packing pressure must be over a threshold to achieve sufficient filling of a fill volume in the cavities of a rotor. As illustrated in FIG. 8B, the total filled polymer mass for an experimental rotor is dramatically reduced, corresponding to an approximate 5% reduction in total filled mass when the packing pressure percentage of 7% is applied. At a packing pressure percentages of about 11% and 14%, the polymer mass remains relatively similar to the total filled mass of a packing pressure percentage of 100%. Packing pressure percentages of 11% and 15% are thus experimentally determined to be sufficient in terms of total filled mass. The excessive mass under some packing pressures may result in over-packing. The experimental simulation, as well as experimentally conducted injection molds, confirm that rotor cavities are under-filled at a packing pressure of 5 MPa. Therefore, a packing pressure range between 8 to 70 MPa has been determined to be preferable in terms of optimizing fill mass. In some embodiments, a packing pressure range between 5.1 and 50 MPa is further preferred for optimizing fill mass.

In an embodiment of the present disclosure, the experimental results and simulations of described above lead to the conclusion that an optimized injection molding process may be carried out by first injecting a cavity volume at a higher pressure during an injection process. Then, during a subsequent packing process, a remaining volume in the cavity may be filled at a reduced pressure that is between one half and one fifth of the first pressure. In an embodiment, the subsequent packing process is between one half and one twentieth of the first pressure. The packing process is continued unit the entire volume of the cavity is filled.

Figure 9:
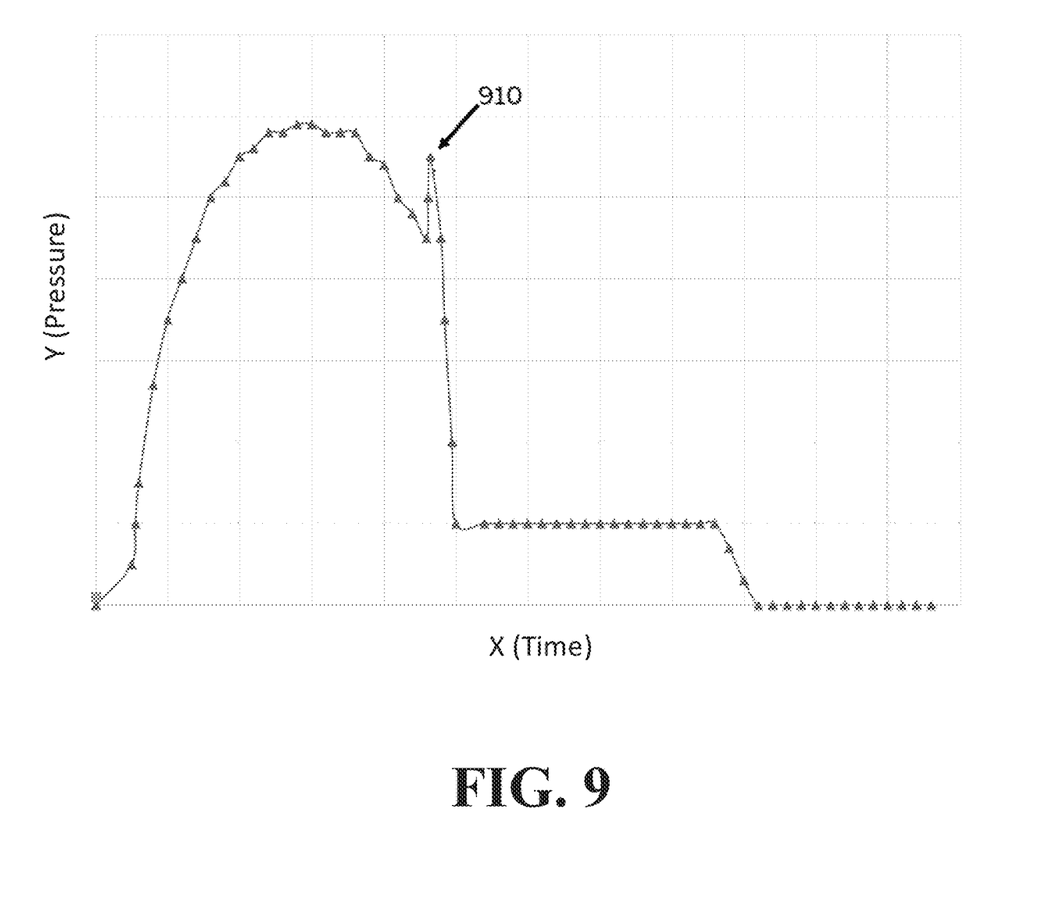
FIG. 9 illustrates a molding parameter quality control scheme.

FIG. 9 illustrates a graph plotting pressure (y-axis) against time (x-axis). As described above, in an injection molding process according to an embodiment of the invention, an optimal molding process includes a full rotor fill while remaining within acceptable rotor tolerances. In an embodiment of the present disclosure, a molding process may be evaluated ex post facto to determine whether a pressure spike 910 in a pressure vs. time graph representing the molding process has occurred. The pressure spike 910 occurs during the injection phase prior to the packing phase. The pressure spike 910 occurs as a result proper and complete fill of rotor cavities. That is, as the rotor cavities approach a complete fill, the pressure increases at a rapid rate due to the suddenly decreasing unfilled volume remaining within the rotor's cavities. Upon completion of the injection phase and a proper fill of the rotor's cavities, the pressure immediately decreases at a rapid rate towards a lower packing pressure. The rapid increase in pressure, followed by a rapid decrease in pressure, forms the readily observable pressure spike 910 in the pressure graph. Although other molding processes (such as the processes with different control objectives illustrated in FIGS. 3A and 3C) will observe pressure peaks, the maximum pressures in such processes will be observable over greater periods of time, and would thus not form a sharp pressure spike 910 such as the one illustrated in FIG. 9. Thus, by monitoring pressure during a molding process, a determination may be made as to whether or not a proper and/or complete fill of a rotor's cavities has been achieved based on the presence or absence of a pressure spike 910. In contrast, by monitoring pressure during a molding process, a determination may be made as to the cause of a poor quality rotor. For example, the absence of a pressure spike 910 and a prolonged period of peak pressure during an injection phase may indicate that an overfill has occurred, or that a high pressure was maintained for too long a time period and caused unacceptable rotor deformation. In another example, the absence of a rapid pressure increase that would form the beginning of a pressure spike 910 may indicate an underfill, as a sufficient fill was never achieved that would cause the pressure to increase rapidly.

In an embodiment, a preferred control scheme according to the present disclosure may correspond to the control scheme illustrated in FIG. 3C in which both injection pressure and packing pressure are optimized and controlled. The maximum injection pressure is limited and the injection time is pre-defined. When the injection is finished, the applied pressure is reduced to a lower packing pressure that is held constant until the polymer is solidified. This control scheme allows a higher degree of control to be maintained over the injection molding process in comparison to the other control schemes described herein. However, the cycle time is generally longer in comparison to other control schemes. The present control scheme restricting both injection and packing pressure has other benefits, including: (1) avoidance of excessive injection pressures, and thus avoidance of rotor deformation exceeding acceptable tolerances; (2) more customizability in terms of tuning the molding process; (3) more predictable and controllable injection molding cycle times; and (4) more controlled clamp forces.

It will be readily understood that molding techniques other than injection molding may be implemented without departing from the spirit of the disclosed embodiments of the present invention. For example, some embodiments may include compression molding and transfer molding to fill cavities of a rotor with polymer bonded magnetic material.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for molding a magnetic material into a rotor stack, comprising:
    providing a polymer melt including magnetic compound particles and a polymer binder;
    providing a rotor comprising a plurality of cavities, the rotor being arranged in a mold having a mold cavity surface;
    providing a gap between an outer periphery of the rotor and the mold cavity surface;
    filling a first volume of the polymer melt into the cavities of the rotor at a first injection pressure during a first time period; and
    filling a second volume of the polymer melt into the cavities of the rotor at one or more second injection pressures during a second time period, the one or more second injection pressures being less than the first injection pressure and above an ambient pressure, and the second time period following successively after the first time period such that the first and second volumes of the polymer melt are injected continuously into the cavities of the rotor from a beginning of the first time period to an end of the second time period.

2. The method of claim 1, wherein the rotor stack is configured to not deform by expanding radially outward into the gap based on the first injection pressure and the one or more second injection pressures.

3. The method of claim 1, wherein a multi-stage molding process is adopted and wherein the one or more second injection pressures are between one half and one twentieth of the first injection pressure.

4. The method of claim 3, wherein the one or more second injection pressures are between 5% to 80% of the first injection pressure.

5. The method of claim 4, wherein the first volume is 50 to 99% of a total fill volume of the plurality of rotor cavities.

6. The method of claim 5, wherein the sum of the first volume and the second volume is equal to at least 85% of the total fill volume of the plurality of rotor cavities.

7. The method of claim 1, wherein the one or more second injection pressures include at least two pressures, and wherein one of the at least two pressures is at least one twentieth of the first injection pressure.

8. The method of claim 1, wherein the one or more second injection pressures includes a range of pressures, and wherein at least part of the second volume of the polymer melt is injected into the rotor mold over the range of pressures.

9. The method of claim 1, wherein filling of the first volume and the second volume is carried out by injection molding.

10. The method of claim 1, wherein filling of the first volume and the second volume is carried out by compression molding or transfer molding.

11. The method of claim 1, further comprising:
measuring pressure within a molding system over the course of the filling of the first and second volumes of the polymer melt into the rotor; and
after filling the second volume of the polymer melt into the rotor, determining whether a pressure spike occurred prior to the second volume of the polymer melt being filled into the rotor,
wherein the pressure spike includes a rapid increase in pressure followed immediately by a rapid decrease in pressure.

12. A method for determining optimal molding parameters for molding a magnetic material into a rotor stack, comprising:
providing a polymer melt including magnetic compound particles and a polymer binder;
providing a rotor comprising a plurality of cavities;
determining a maximum first injection pressure at which a first volume of the polymer melt can be filled into the cavities of the rotor during a first time period; and
determining a maximum second injection pressure at which a second volume of the polymer melt can be filled into the cavities of the rotor during a second time period that follows successively after the first time period such that the first and second volumes of the polymer melt are injected continuously into the cavities of the rotor from a beginning of the first time period to an end of the second time period.

13. The method of claim 12, wherein the first volume and the second volume are filled into the cavities of the rotor by injection molding, the maximum second injection pressure corresponding to a maximum packing pressure.

14. The method of claim 13, further comprising decreasing a first injection pressure from the maximum first injection pressure until a rotor deformation associated with the first injection pressure is at or below a first predetermined deformation threshold.

15. The method of claim 14, further comprising decreasing the packing pressure from the maximum packing pressure until a rotor deformation associated with the packing pressure is at or below a second predetermined deformation threshold.

16. The method of claim 12, wherein the first volume and the second volume are filled into the cavities of the rotor by compression molding or by transfer molding.

17. The method of claim 1, wherein the first injection pressure and the one or more second injection pressures are localized at a gate or injection point associated with the cavities of the rotor.

18. A method for molding a magnetic material into a rotor stack, comprising:
providing a polymer melt including magnetic compound particles and a polymer binder;
providing a rotor comprising a plurality of cavities, the rotor being arranged in a mold having a mold cavity surface;
providing a gap between the outer periphery of the rotor and the mold cavity surface;
filling a first volume of the polymer melt into the cavities of the rotor at a first pressure;
filling a second volume of the polymer melt into the cavities of the rotor at one or more second pressures, the one or more second pressures being less than the first pressure and above an ambient pressure,
measuring pressure within a molding system over the course of the filling of the first and second volumes of the polymer melt into the rotor; and
after filling the second volume of the polymer melt into the rotor, determining whether a pressure spike occurred prior to the second volume of the polymer melt being filled into the rotor,
wherein the pressure spike includes a rapid increase in pressure followed immediately by a rapid decrease in pressure.

* * * * *